United States Patent
Wagh et al.

(10) Patent No.: US 7,160,383 B2
(45) Date of Patent: *Jan. 9, 2007

(54) COMPOSITION AND APPLICATION OF NOVEL SPRAYABLE PHOSPHATE CEMENT (GRANCRETE) THAT BONDS TO STYROFOAM

(75) Inventors: Arun S. Wagh, Naperville, IL (US); James W. Paul, Jr., Mechanicsville, VA (US)

(73) Assignee: UChicago Argonne, LLC, Chicago, IL (US)

( * ) Notice: Subject to any disclaimer, the term of this patent is extended or adjusted under 35 U.S.C. 154(b) by 134 days.

This patent is subject to a terminal disclaimer.

(21) Appl. No.: 10/868,062

(22) Filed: Jun. 15, 2004

(65) Prior Publication Data
US 2005/0274290 A1 Dec. 15, 2005

(51) Int. Cl.
*C04B 12/04* (2006.01)
*C04B 14/00* (2006.01)
*C04B 2/00* (2006.01)
*B05D 1/30* (2006.01)
*B05D 5/00* (2006.01)
*B05D 7/00* (2006.01)

(52) U.S. Cl. ............ 106/691; 106/705; 106/710; 106/801; 106/711; 106/816; 106/708; 106/792; 106/800; 427/372.2; 427/421.1

(58) Field of Classification Search ............ 106/691, 106/705, 710, 801, 711, 816, 708, 792, 800; 427/372.2, 421.1
See application file for complete search history.

(56) References Cited

U.S. PATENT DOCUMENTS

| | | | |
|---|---|---|---|
| 5,645,518 A | 7/1997 | Wagh et al. | |
| 5,830,815 A | 11/1998 | Wagh et al. | |
| 5,846,894 A | 12/1998 | Singh et al. | |
| 6,153,809 A | 11/2000 | Singh et al. | |
| 6,204,214 B1 * | 3/2001 | Singh et al. | 501/155 |
| 6,498,119 B1 | 12/2002 | Wagh et al. | |
| 6,518,212 B1 | 2/2003 | Wagh et al. | |
| 2002/0009622 A1 * | 1/2002 | Goodson | 428/703 |
| 2003/0092554 A1 * | 5/2003 | Wagh et al. | 501/1 |
| 2003/0131759 A1 * | 7/2003 | Francis et al. | 106/286.1 |

* cited by examiner

*Primary Examiner*—Elizabeth D. Wood
(74) *Attorney, Agent, or Firm*—Emrich & Dithmar LLC

(57) ABSTRACT

A dry mix particulate composition of a calcined oxide of Mg and/or Ca, an acid phosphate, and fly ash or equivalent, wherein the calcined oxide is present in the range of from about 17% to about 40% by weight and the acid phosphate is present in the range of from about 29% to about 52% by weight and the fly ash or equivalent is present in the range of from about 24% to about 39% by weight when sand is added to the dry mix, it is present in the range of from about 39% to about 61% by weight of the combined dry mix and sand. A method of forming a structural member is also disclosed wherein an aqueous slurry of about 8–12 pounds of water is added to dry mix and sand.

20 Claims, No Drawings

COMPOSITION AND APPLICATION OF NOVEL SPRAYABLE PHOSPHATE CEMENT (GRANCRETE) THAT BONDS TO STYROFOAM

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

This invention relates to a pumpable ceramic, and more particularly, this invention relates to a ceramic composition which can be used in the construction industry applicable to a wide variety of temperature conditions to apply the ceramic to a vertical wall as well as to sloping and horizontal walls, such as roofs, to provide an inexpensive coating material for cement or styrofoam bases.

There is a significant need, particularly in the Caribbean and South American countries, for a construction material which can be mixed on site, applied to a base structure, including styrofoam, which can be worked such as troweled and yet sets in a sufficiently short amount of time that no mechanical anchors such as wires and other mechanism is required to hold the product onto vertical surfaces. Inexpensive housing is a requirement in developing countries and particularly inexpensive housing which can be erected rapidly without the need for skilled labor and which is capable of withstanding subtropical and tropical climates.

Argonne National Laboratory has been a leader in developing phosphate based cement or ceramic products which are useful for a wide variety of applications, as indicated by Wagh et al. U.S. Pat. No. 5,645,518 issued Jul. 8, 1997 for Method For Stabilizing Low-Level Mixed Wastes At Room Temperature, Wagh et al. U.S. Pat. No. 5,830,815 issued Nov. 3, 1998 for Method of Waste Stabilization Via Chemically Bonded Phosphate Ceramics, Singh et al. U.S. Pat. No. 5,846,894 issued Dec. 8, 1998 for Phosphate Bonded Structural Products From High Volume Wastes, Wagh et al. U.S. Pat. No. 6,153,809 issued Nov. 28, 2000 for Stabilization of Metal and Salt Anions in Phosphate Ceramics, Singh et al. U.S. Pat. No. 6,204,214 issued Mar. 20, 2001 for Pumpable/Injectable Phosphate-Bonded Ceramics, Wagh et al. U.S. Pat. No. 6,498,119 issued Dec. 24, 2002 for Chemically Bonded Phosphate Ceramics of Trivalent Oxides of Iron and Manganese and Wagh et al. U.S. Pat. No. 6,518,212 issued Feb. 11, 2003 for Chemically Bonded Phosphosilicate Ceramics, the entire disclosures of each of the above-referenced patents being incorporated herein by reference.

In general, the above patents disclose a chemically bonded monovalent alkali metal phosphate or ammonium hydrogen phosphate and a sparsely soluble oxide such as magnesium or calcium oxide with a variety of filler materials to provide a useful material for a wide variety of end products.

However, it has now been discovered that using a different ratio of materials provides a pumpable phosphate based cement product which can be used to form rigid vertical walls and roofs and facilitates rapid construction of buildings and other structures in a wide variety of temperature and humidity conditions.

SUMMARY OF THE INVENTION

Accordingly, it is an object of the present invention to provide a pumpable phosphate based cement product which can be worked such as by troweling which sets sufficiently rapidly in a wide variety of temperature and humidity conditions to be useful as a construction material on vertical and horizontal walls and sloping walls.

Another object of the present invention is to provide a dry mix particulate composition, comprising a calcined oxide of Mg and/or Ca, an acid phosphate, and fly ash or equivalent, wherein the calcined oxide is present in the range of from about 17% to about 40% by weight and the acid phosphate is present in the range of from about 29% to about 52% by weight and the fly ash or equivalent is present in the range of from about 24% to about 39% by weight.

Yet another object of the present invention is to provide a method of forming a structural member, comprising applying an aqueous slurry of a dry mix of a calcined oxide of Mg and/or Ca and an acid phosphate and fly ash or an equivalent and sand, wherein the calcined oxide is present in the range of from about 17% to about 40% by weight and the acid phosphate is present in the range of from about 29% to about 52% by weight and the fly ash or equivalent is present in the range of from about 24% to about 39% by weight and sand is present in the range of from about 39% to about 61% by weight of the dry mix and sand to a substrate, and allowing the slurry to cure.

And yet a final object of the present invention is to provide a dry mix particulate composition, comprising a calcined MgO, a potassium acid phosphate, and fly ash or equivalent, wherein the calcined MgO is present in the range of from about 17% to about 40% by weight and the potassium acid phosphate is present in the range of from about 29% to about 52% by weight and the fly ash or equivalent is present in the range of from about 24% to about 39% by weight, and wherein the weight ratio of calcined MgO to potassium acid phosphate is about one.

DETAILED DESCRIPTION OF THE INVENTION

Although the hereinafter detailed description of the invention using calcine magnesium oxide, fly ash and beach sand as constituent parts of the invention, calcium oxide may be substituted for the magnesium oxide entirely or partially, volcanic ash or other suitable substitutes, known in art, may also be used in lieu of or in combination with fly ash. Other fillers in addition to sand may also be used, all as well known in the art.

This invention provides a cement type product that is particularly suited for construction of buildings using Styrofoam base and for the repair of existing concrete and other structures, because it adheres to the Styrofoam and to existing concrete and many other materials. The rapid setting of the material is desirable because when sprayed onto vertical walls, it will solidify while allowing just enough time for surface treatment such as troweling. The product reacts with Styrofoam and also with concrete and many other surfaces and hence the bond is chemical and strong. This characteristic eliminates the need for any mechanical anchors such as wires to hold the product onto vertical surfaces. The benefits of the process and product disclosed in this invention over the conventional block or poured concrete construction are:

Enhanced speed of construction,

Superior quality of the product compared to concrete: e.g. no shrinking or cracking, Excellent barrier to moisture, Excellent thermal insulation due to Styrofoam, Fire resistant surface, and Two to three times the compressive strength and six times the flexural strength.

In tropical and sub-tropical climates, concrete is subject to rapid erosion while the subject inventive material is not.

The packaged powder is free flowing and the pre-blended and pre-packaged material can be stored and shipped long distances without occurrence of lumping or hardening.

The ability to make adjustments in the mix ratios of the components allows the product to be used in various ambient temperatures and performance can be standardized to provide fixed blending, pumping, and spraying time. With adjustment in compositions, desired time for hardening and adhering to the Styrofoam or concrete is achieved.

The inventive composition differs from those claimed in previous patents cited herein. For example, the ratio of potassium phosphate and magnesium oxide in earlier patents has been governed by stoichiometry of reaction between them, i.e., the ratio has been 3:1 approximately. However, during the case studies to build a house using these compositions, we have discovered that this ratio is not usable. The surprising discovery that is herein claimed is the unique composition, in which the ratio is closer to one, which provides a rapidly setting material which can be applied to vertical surfaces.

In addition to monopotassium phosphate and magnesium oxide, fly ash, sodium borate (optionally), and sand are used in the total composition. The product formed from blending these components in various ratios allows the mixture to be sprayed onto Styrofoam walls for construction of new buildings and the mixture can also be applied to existing concrete structures as a repair agent because of its ability to adhere to standard concrete. This process of rapid construction of buildings is also novel.

The process consists of mixing a paste as hereinafter described in a concrete screw mixer and then pumping it through hoses to a spray nozzle which is used to spray the slurry on vertical walls. The total time of mixing and spraying takes approximately 10 min. Once sprayed, the slurry is thick and does not drip down from the wall, but starts hardening by releasing exothermic heat. This heat helps to produce a chemical reaction between the Styrofoam or cement surfaces and the hardened product creating an infinite bond with the base surface.

In the case of a Styrofoam wall, bonding may be enhanced by painting the wall with acrylic coating. In lieu of painting, an acrylate may be mixed with the dry mix prior to formulating the slurry. In the case of cement wall, such an acrylate coating is not required because calcium compounds in cement react with the slurry and good bonding occurs between the two.

The sprayed surface can be troweled to create a smoother surface, or designs can be engraved on the surface using suitable molds. Once set, the surface can be painted using conventional paints.

TABLE 1

Compositions for 100 pounds of bulk material blend.

| Component | General range | Preferred range | Most preferred range |
|---|---|---|---|
| Magnesium oxide (pounds) | 9–20 | 15–19 | 16–18 |
| Mono potassium phosphate (pounds) | 15–26 | 16–20 | 17–18 |
| Sand (pounds) | 40–60 | 45–55 | 50 |
| Boric acid or sodium tetraborate (ounces) | 0–8 | 1–4 | 1–2 |
| Glass or any other fiber (one inch length) (ounces) | 0–8 | 1–6 | 3–5 |
| Water (gallons) | 1–1.5 | 1.25–1.5 | 1.3–1.4 |

The following example illustrate compositions of the powder materials and the process for the intended applications.

EXAMPLE 1

Low Ambient Temperature Applications

The test was conducted at 40° F. The composition used in this example is recommended for a temperature range of 40 to 60° F. The composition used in this case was 18 parts of MgO, 17 parts of monopotassium phosphate, and 15 parts of ash. This blend was mixed with 50 parts of sand and 11 parts of water by weight. The entire mixture was put in a hopper, mixed, pumped, and sprayed on walls of a prototype one room house made of Styrofoam sheets and erected on a concrete foundation. Even the roof of the house was made of Styrofoam sheets that were secured in aluminum brackets. Continuous spraying was possible for hours and the entire house was sprayed in 4–5 hours. Soon after spraying, some areas were smoothed by troweling.

Within an hour, the walls warmed up indicating a chemical reaction was occurring within the wall. The surface became hard and the walls and roof were very rigid and firm. When sections of the wall were cut and the interface of the Styrofoam and set material was examined, we found that the two were inseparable without destroying the Styrofoam.

The room was essentially built by two persons working one full day. It is noteworthy to point out that the exothermic reaction was compensating for the ambient air temperature so the product did blend well with this ratio.

EXAMPLE II

This example was conducted for ambient temperature between 60–80° F. The entire procedure for building a house was same as in Example 1, but now we used a different composition. 17 parts MgO, 17 parts monopotassium phosphate, 16 parts ash, and 50 parts sand was used. All the components except sand were bagged in 50 pounds bags and were transported to the site. Sand and 11 parts of water were added at the site. In addition, up to 4 ounces of boric acid or sodium tetraborate for every 100 pounds of the total mixture was added, as needed, to slow down the reaction rate.

The Styrofoam walls were coated with acrylic paint. Again the results were equally good as described in Example 1. When sections of the walls were cut out, the Styrofoam could not be separated from applied material, without destroying the Styrofoam because the bonding was intimate.

EXAMPLE III

The formulation found for temperatures 80–100° F. consists of 16.5 parts MgO, 17 parts of monopotassium phosphate, 16 parts ash, 50 parts of sand and 10.5 parts water. Again 8 ounces of boric acid or sodium tetraborate were added to 100 pounds of the mixture, as needed.

It is was also discovered that the addition of 2–4 ounces of 1 inch length poly fiber added to each 50 pound bag of the blended dry mix helped prevent any cracking or shrinking of the product once it is applied to the Styrofoam or concrete surface being worked with.

Overall, these examples demonstrate the feasibility of using the inventive formulation and method for the entire ambient temperature range of about 40° F. to 100° F. and how the formulations can be adjusted to achieve that. In general, Table 1 sets forth the ranges for each constituent of the inventive material, it being understood that the ratios of constituents may be varied according to local temperature and humidity conditions. The sand used was preferably 30 mesh.

Although monopotassium phosphate was used in the Examples, other phosphates, such as magnesium or aluminum dihydrogen phosphates, ammonium mono or dihydrogen phosphate, calcium dihydrogen phosphate, triple super phosphate fertilizer or combination thereof may be substituted, in whole or in part, as is known in the art. Although glass fibers were specifically disclosed, other fibers such as corn, sisal or hemp may be substituted, in whole or in part, as is known in the art.

In general, for a dry mix of calcined oxide, acid phosphate and fly ash or equivalent, the preferred ratios are calcined oxide between about 17% to about 40%, acid phosphate between about 29% and about 52% and fly ash or equivalent between about 24% to about 39%, all percents by weight. Most preferably, the percents respectively are, 32–36%, 33–37% and 29–37%.

When sand or equivalent is added to the dry mix above, the sand is present between about 39% to about 61% by weight of the combined dry mix and sand. Water is added to the combination of dry mix and sand preferably between 8 and about 12 pounds water per 100 pounds of dry mix and sand. High aspect glass fibers or equivalent may be added, as may borates to control the rate of reaction.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A dry mix particulate composition, comprising a calcined oxide of Mg and/or Ca, an acid phosphate, and fly ash or equivalent, wherein said calcined oxide is present in the range of from about 17% to about 40% by weight and said acid phosphate is present in the range of from about 29% to about 52% by weight and said fly ash or equivalent is present in the range of from about 24% to about 39% by weight and wherein the weight ratio of calcined oxide to acid phosphate is about 1.

2. The dry mix particulate composition of claim 1, wherein said calcined oxide is present in the range of from about 32% to about 36% by weight and said acid phosphate is present in the range of from about 33% to about 37% by weight and fly ash or equivalent is present in the range of from about 29% to about 33% by weight.

3. The dry mix particulate composition of claim 1 and further including sand present in the range of from about 39% to about 61% by weight of the combined dry mix and sand.

4. The dry mix particulate composition of claim 2, wherein said oxide is MgO and said acid phosphate is $KH_2PO_4$.

5. The dry mix particulate composition of claim 1, wherein the equivalent to fly ash is volcanic ash.

6. An aqueous slurry comprising the dry mix particulate composition of claim 3, wherein the weight ratio of calcined oxide to acid phosphate is about one and water is present in the range of from about 8 to about 12 pounds per 100 pounds of dry mix and sand to form an aqueous slurry.

7. The aqueous slurry of claim 6, wherein boric acid or sodium borate is present in the dry mix and sand.

8. The aqueous slurry of claim 6, wherein high aspect fibers are present in the dry mix and sand.

9. The aqueous slurry of claim 6, wherein said sand is screened to sieve size of 30 mesh.

10. The aqueous slurry of claim 6, wherein an acrylate is present in the dry mix and sand.

11. A method of forming a vertical structural member, comprising applying an aqueous slurry of a dry mix of a calcined oxide of Mg and/or Ca and an acid phosphate and fly ash or an equivalent and sand, wherein the calcined oxide is present in the range of from about 17% to about 40% by weight and the acid phosphate is present in the range of from about 29% to about 52% by weight and the fly ash or equivalent is present in the range of from about 24% to about 39% by weight and sand is present in the range of from about 39% to about 61% by weight of the dry mix and sand to a substrate, the weight ratio of calcined oxide to acid phosphate being about 1, and allowing the slurry to cure, the slurry being of a consistency so as not to drip or sag and starting to harden upon application.

12. The method of claim 11, wherein water is present in the range of from about 8 to about 12 pounds per 100 pounds of dry mix and sand.

13. The method of claim 12, wherein the substrate is styrofoam coated with acrylic.

14. The method of claim 12, wherein the substrate is cement.

15. The method of claim 12, wherein the aqueous slurry is sprayed onto a vertical surface.

16. The method of claim 11, wherein boric acid or sodium borate is present to control the cure rate of the slurry.

17. The method of claim 12, wherein the calcined oxide is present in the range of from about 32% to about 36% by weight and the acid phosphate is present in the range of from about 33% to about 37% by weight and fly ash or equivalent is present in the range of from about 29% to about 33% by weight of the dry mix.

18. The method of claim 17, wherein the oxide is MgO and the acid phosphate is $KH_2PO_4$.

19. The method of claim 17, wherein an acrylate is present in the dry mix.

20. A dry mix particulate composition, comprising a calcined MgO, a potassium acid phosphate, and fly ash or equivalent, wherein said calcined MgO is present in the range of from about 17% to about 40% by weight and said potassium acid phosphate is present in the range of from about 29% to about 52% by weight and said fly ash or equivalent is present in the range of from about 24% to about 39% by weight, and wherein the weight ratio of calcined MgO to potassium acid phosphate is about one.

* * * * *